(12) United States Patent
Tylutki et al.

(10) Patent No.: US 9,074,507 B2
(45) Date of Patent: Jul. 7, 2015

(54) EVENT-BASED DEVIATION INTEGRATION TEMPERATURE CONTROL LOOP DIAGNOSTIC SYSTEM

(71) Applicant: GM Global Technology Operations LLC, Detroit, MI (US)

(72) Inventors: Vincent J. Tylutki, Livonia, MI (US); Benjamin Radke, Waterford, MI (US); Janean E. Kowalkowski, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 13/961,239

(22) Filed: Aug. 7, 2013

(65) Prior Publication Data
US 2015/0040539 A1    Feb. 12, 2015

(51) Int. Cl.
*F01N 3/00*  (2006.01)
*F01N 3/025* (2006.01)
*F01N 11/00* (2006.01)

(52) U.S. Cl.
CPC ............ *F01N 3/0256* (2013.01); *F01N 11/002* (2013.01)

(58) Field of Classification Search
CPC ..... F02D 41/029; F01N 9/002; F01N 3/0842; F01N 3/035; F01N 3/0814; F01N 13/02
USPC .................. 60/273, 274, 285, 286, 297, 311; 701/29, 29.1, 31.8, 34.4, 108
See application file for complete search history.

(56) References Cited

U.S. PATENT DOCUMENTS

| | | | |
|---|---|---|---|
| 2005/0102076 A1* | 5/2005 | Kariya et al. | 701/34 |
| 2005/0241301 A1* | 11/2005 | Okugawa et al. | 60/295 |
| 2007/0144146 A1* | 6/2007 | Kusatsugu | 60/277 |
| 2008/0041035 A1* | 2/2008 | Sawada et al. | 60/277 |
| 2009/0003405 A1* | 1/2009 | Corbet et al. | 374/1 |
| 2010/0058743 A1* | 3/2010 | Tsukada et al. | 60/287 |
| 2010/0206060 A1* | 8/2010 | Liu et al. | 73/114.61 |
| 2010/0319319 A1* | 12/2010 | Ide | 60/277 |
| 2011/0000193 A1* | 1/2011 | Paterson et al. | 60/277 |
| 2011/0066316 A1* | 3/2011 | Perrard | 701/29 |

FOREIGN PATENT DOCUMENTS

JP    2004353606 A * 12/2004 ............... F01N 3/20

* cited by examiner

*Primary Examiner* — Thomas Denion
*Assistant Examiner* — Patrick Maines
(74) *Attorney, Agent, or Firm* — Cantor Colburn LLP

(57) ABSTRACT

An exhaust gas treatment system includes a particulate filter to collect particulate matter from exhaust gas flowing therethrough. A regeneration module performs a regeneration operation that regenerates the particular filter. The regeneration operation generates an exothermic event which heats the particulate filter above a target temperature that burns the particulate matter. At least one temperature sensor is disposed adjacent the particular filter to determine at least one temperature of the exhaust gas. The exhaust gas treatment system further includes a temperature diagnostic module to determine a temperature profile of the particulate filter based on the temperature of the exhaust gas. The temperature diagnostic module further determines a temperature deviation of the particulate filter based on a comparison between the temperature profile and a target temperature. The temperature diagnostic module diagnoses the regeneration operation based on a plurality of temperature deviations and a selected time period.

9 Claims, 3 Drawing Sheets

EVENT-BASED DEVIATION INTEGRATION TEMPERATURE CONTROL LOOP DIAGNOSTIC SYSTEM

FIELD OF THE INVENTION

Exemplary embodiments of the invention relate to an exhaust gas treatment system of an internal combustion engine, and more particularly, to a diagnostic system to monitor a temperature control loop of a particulate filter regeneration process.

BACKGROUND

Exhaust gas emitted from an internal combustion engine is a heterogeneous mixture that contains gaseous emissions such as, but not limited to, carbon monoxide ("CO"), unburned hydrocarbons and oxides of nitrogen ("$NO_x$") as well as particulate matter comprising condensed phase materials (liquids and solids).

A vehicle may include an exhaust gas treatment system to treat the exhaust gas. Typical exhaust gas treatment systems include a particular filter ("PF") including a PF substrate to collect particulate matter (e.g., soot) from the exhaust gas. The amount of particulates captured by the PF increases over time and can cause the PF substrate to become overloaded. A regeneration operation is selectively performed that introduces additional heat upstream from the PF to burn off the carbon and soot collected in the PF substrate. Accordingly, the PF may be cleaned and regenerated for further use.

SUMMARY OF THE INVENTION

In one exemplary embodiment, an exhaust gas treatment system includes a particulate filter to collect particulate matter from exhaust gas flowing therethrough. A regeneration module performs a regeneration operation that regenerates the particular filter. The regeneration operation generates an exothermic event that heats the particulate filter above a target temperature that burns the particulate matter. At least one temperature sensor is disposed adjacent to the particular filter to determine at least one temperature of the exhaust gas. The exhaust gas treatment system further includes a temperature diagnostic module to determine a temperature profile of the particulate filter based on the temperature of the exhaust gas. The temperature diagnostic module further determines a temperature deviation of the particulate filter based on a comparison between the temperature profile and a target temperature. The temperature diagnostic module diagnoses the regeneration operation based on a plurality of temperature deviations and a selected time period.

In another exemplary embodiment, a hardware control module to diagnose a regeneration operation for regenerating a particulate filter comprises a memory to store a plurality of target temperature values indicating a combustion temperature that burns soot contained on the particulate filter. The memory further stores at least one inlet temperature value and at least one outlet temperature value. The inlet temperature value is indicative of the temperature at an inlet of the particulate filter. The outlet temperature value is indicative of the temperature at an outlet of the particulate filter. The control module further includes a temperature diagnostic module in electrical communication with the memory. The temperature diagnostic module determines a temperature profile of the particulate filter based on a difference between the outlet temperature and the inlet temperature. The temperature diagnostic module further determines a temperature deviation of the particulate filter based on a comparison between the temperature profile and a target temperature. The temperature diagnostic module further generates a diagnostic signal that diagnoses the regeneration operation based on a plurality of temperature deviations and a selected time period.

In yet another exemplary embodiment, a method of diagnosing a regeneration operation for regenerating a particulate filter comprises performing an exothermic event to heat the particulate filter above a target temperature that burns particulate matter contained therein. The method further includes determining a temperature profile of the particulate filter, and determining a temperature deviation of the particulate filter with respect to the target temperature. The temperature deviation is determined based on a comparison between the temperature profile and a target temperature. The method further includes generating a diagnostic signal that diagnoses the regeneration operation based on a plurality of temperature deviations and a selected time period.

Various features the exemplary embodiments are readily apparent from the following detailed description of the invention when taken in connection with the accompanying drawings.

BRIEF DESCRIPTION OF THE DRAWINGS

Other features, and details appear, by way of example only, in the following detailed description of embodiments, the detailed description referring to the drawings in which.

DESCRIPTION OF THE EMBODIMENTS

Figure 1:
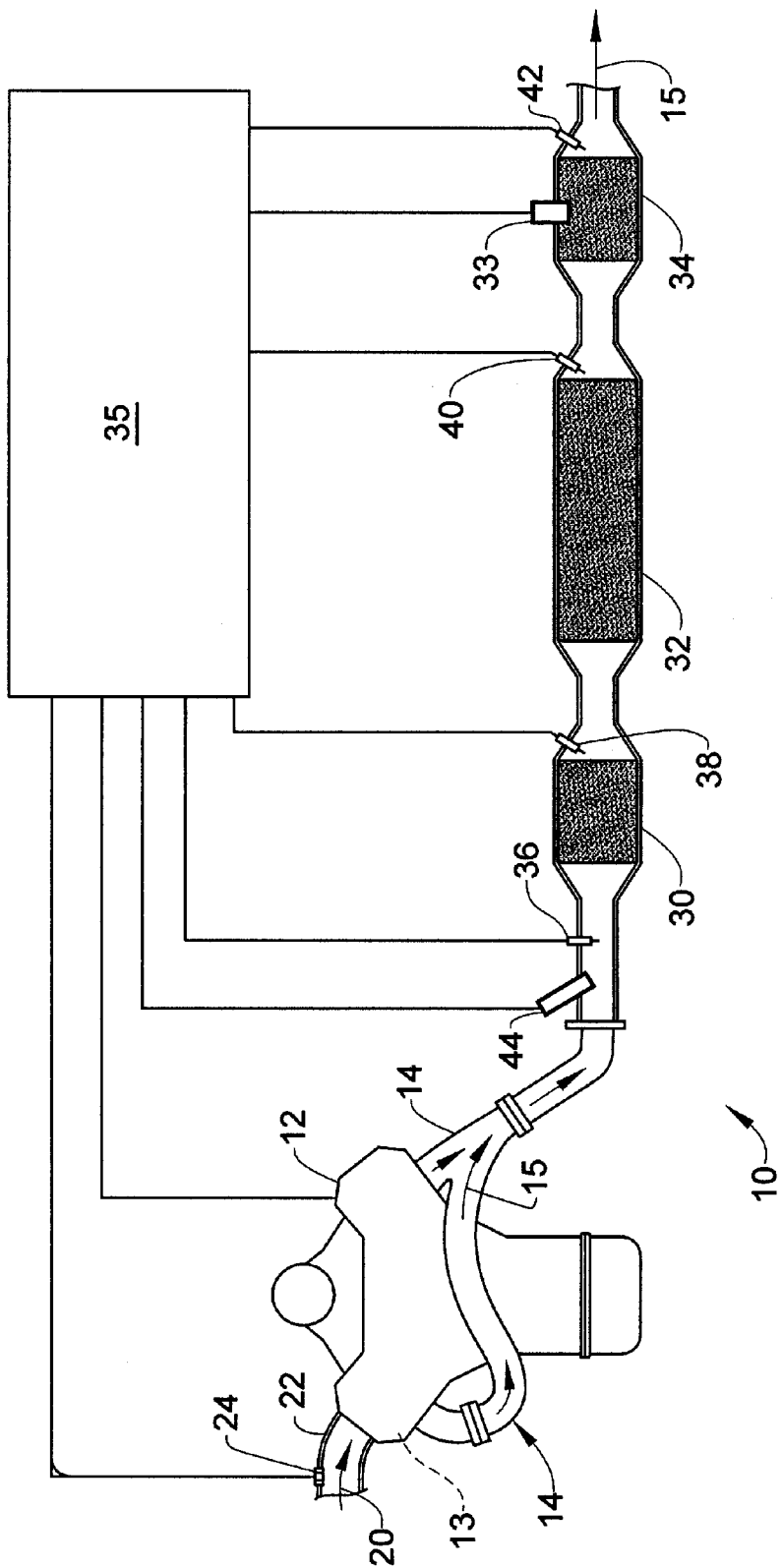
FIG. 1 is a schematic diagram of an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. The hardware module may include a microcontroller as understood by those ordinarily skilled in the art. When implemented in software, a module can be embodied in memory as a non-transitory machine-readable storage medium readable by a processing circuit and storing instructions for execution by the processing circuit for performing a method.

Referring now to FIG. 1, an exhaust gas treatment system 10 of an internal combustion (IC) engine 12 is illustrated according to an exemplary embodiment. The engine 12 may include, but is not limited to, a diesel engine, gasoline engine, and a homogeneous charge compression ignition engine. In addition, the exhaust gas treatment system 10 described herein may be implemented in any of the engine systems mentioned above. The engine 12 includes at least one cylinder 13 that receives fuel, and is configured to receive an intake air 20 from an air intake passage 22. The intake air passage 22 includes an intake mass air flow (MAF) sensor 24 to determine an intake air mass (mAir) of the engine 12. In one embodiment, the intake mass air flow sensor 24 may include either a vane meter or a hot wire type intake mass air flow sensor. However, it is appreciated that other types of sensors may be used as well. An exhaust gas conduit 14 may convey exhaust gas 15 that is generated in response to combusting the fuel in the cylinder 13. The exhaust gas conduit 14 may include one or more segments containing one or more aftertreatment devices of the exhaust gas treatment system 10, as discussed in greater detail below.

With continuing reference to FIG. 1, exhaust gas treatment system 10 further includes a first oxidation catalyst ("OC") device 30, a selective catalytic reduction ("SCR") device 32, and a particulate filter device ("PF") 34. In at least one exemplary embodiment of the disclosure, the PF is a diesel particulate filter. It is appreciated that the exhaust gas treatment system 10 of the present disclosure may include various combinations of one or more of the aftertreatment devices shown in FIG. 1, and/or other aftertreatment devices (e.g., lean $NO_x$ traps), and is not limited to the present example.

The OC device 30 may include, for example, a flow-through metal or ceramic monolith substrate that is packaged in a stainless steel shell or canister having an inlet and an outlet in fluid communication with exhaust gas conduit 14. The substrate may include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC device 30 may treat unburned gaseous and non-volatile HC and CO, which are oxidized to form carbon dioxide and water.

The SCR device 32 may be disposed downstream from the OC device 30. The SCR device 32 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which may operate efficiently to convert $NO_x$ constituents in the exhaust gas 15 in the presence of a reductant such as ammonia.

The PF 34 may be disposed downstream from the SCR device 32, and filters the exhaust gas 15 of carbon and other particulate matter. According to at least one exemplary embodiment, the PF 34 may be constructed using a ceramic wall flow monolith exhaust gas filter substrate that is wrapped in an intumescent or non-intumescent mat (not shown) that expands, when heated to secure and insulate the filter substrate which is packaged in a rigid, heat resistant shell or canister, having an inlet and an outlet in fluid communication with exhaust gas conduit 14. It is appreciated that the ceramic wall flow monolith exhaust gas filter substrate is merely exemplary in nature and that the PF 34 may include other filter devices such as wound or packed fiber filters, open cell foams, sintered metal fibers, etc.

Exhaust gas 15 entering the PF 34 is forced to migrate through porous, adjacently extending walls, which capture carbon and other particulate matter from the exhaust gas 15. Accordingly, the exhaust gas 15 is filtered prior to being exhausted from the vehicle tailpipe. As exhaust gas 15 flows through the exhaust gas treatment system 10, the PF 34 realizes a pressure across the inlet and the outlet. At least one pressure sensor 33 (e.g., a delta pressure sensor) may determine a pressure differential (i.e., $\Delta p$) across the PF 34. Although a single delta pressure sensor 33 is illustrated, it is appreciated that a plurality of pressure sensors may be used to determine $\Delta p$. The amount of particulates captured by the PF 34 increases over time, thereby increasing the exhaust gas backpressure realized by the engine 12. A regeneration operation burns off the carbon and particulate matter collected in the filter substrate and regenerates the PF 34, as discussed in greater detail below.

A control module 35 may monitor and control the engine 12 and the exhaust gas treatment system 10 based on data provided by one or more sensors. Referring to FIG. 1, the control module 35 is in electrical communication with the engine 12, the intake mass air flow sensor 24, and various temperature sensors. In at least one embodiment, the temperature sensors include a first temperature sensor 36, a second temperature sensor 38, a third temperature sensor 40, and a fourth temperature sensor 42. The first temperature sensor 36 is disposed adjacent to the inlet of the OC device 30 and the second temperature sensor 38 is disposed adjacent to outlet OC device 30. Accordingly, the first and second temperature sensors 36, 38 determine the temperature profile of the OC device 30. The third temperature sensor 40 is interposed between the SCR outlet and the PF inlet. Accordingly, the third temperature sensor 40 determines the outlet temperature of the SCR 32 and the inlet temperature of the PF 34. The fourth temperature sensor 42 is disposed downstream from the PF 34 to determine the outlet temperature of the PF 34. The control module 35 may control the engine 12 based on information provided by one or more of the sensors 36, 38, 40, 42. In at least one exemplary embodiment, a temperature sensor may be disposed adjacent the inlet and outlet of each of the OC device 30, the SCR 32 and the PF 34. The measurements provided by the temperature sensors 36, 38, 40, 42 may also be used to diagnose the regeneration operation, as discussed in greater detail below.

Referring still to FIG. 1, the exhaust gas treatment system 10 further includes an auxiliary fuel injector/igniter 44 disposed upstream from the OC device 30. The auxiliary fuel injector/igniter 44 is in electrical communication with the control module 35, and is configured to inject and ignite fuel, such as hydrocarbon fuel for example. For example, the control module 35 may actively control the auxiliary fuel injector/igniter 44 to inject and ignite fuel stored in a fuel supply (not shown), thereby generating an exothermic event that increases the temperature of the exhaust gas 15. In at least one embodiment, the control module 35 controls the amount of fuel injected and the time at which the fuel is ignited. The increased temperature propagates along the exhaust gas conduit 14, and heats the PF 34 to soot combustion temperatures such that the captured particulate matter and soot is burned off, and the PF 34 is regenerated. The control module 35 may determine the temperature of the PF 34 based on the measurements of the third and fourth temperatures sensors 40, 42. For example, a temperature differential between the third and the fourth temperature sensor 40, 42 may indicate a temperature profile of the PF 34, which allows the control module 35 to determine whether the exothermic event generated by the injected fuel is heating the PF 34 to the appropriate soot combustion temperatures.

Figure 2:
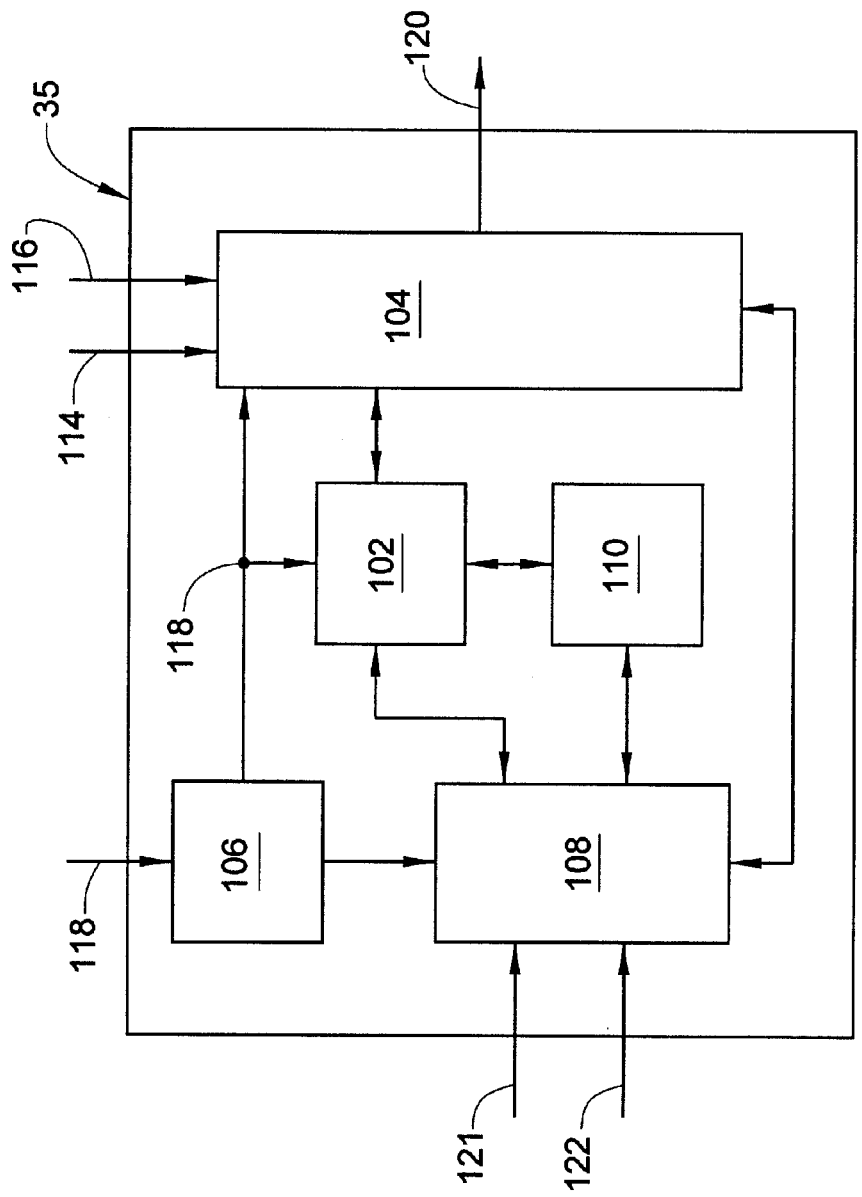
FIG. 2 is a block diagram illustrating a control module that diagnoses a temperature control loop of a particulate filter regeneration operation in accordance with exemplary embodiments.

FIG. 2 illustrates a block diagram of a control module 35 that diagnoses a temperature control loop of a PF regeneration operation in accordance with exemplary embodiments. Various embodiments of the exhaust gas treatment system 10 of FIG. 1 according to the present disclosure may include any number of sub-modules embedded within the control module 35. As can be appreciated, the sub-modules shown in FIG. 2 may be combined or further partitioned as well. Inputs to the control module 35 may be sensed from the exhaust gas treatment system 10, received from other control modules, for example an engine control module, or determined by other sub-modules or modules. As illustrated in FIG. 2, the control module 35 according to at least one embodiment includes a memory 102, a regeneration control module 104, an entry condition module 106, temperature diagnostic module 108, and a debounce module 110. Each of the modules 104-110 interfaces and electrically communicates with the memory 102 to retrieve and update stored values as needed. For example, the memory 102 may store one or more threshold values, time periods over which the temperatures were measured, and one or more offset values, which are utilized by one or more of the modules 104-110 to determine an occurrence of a temperature fault as described in greater detail below.

In one embodiment, the memory 102 of the control module 35 stores a number of configurable limits, maps, data values, variables, and thresholds that are used to control regeneration of the PF 34. In at least one exemplary embodiment, the memory 102 stores one or more target soot combustion temperatures. The soot combustion temperatures include, for example, temperatures in excess of approximately 450 degrees Celsius (approximately 840 degree Fahrenheit) at which soot and particulate matter burn and/or combust. The soot combustion temperatures, however, are not limited thereto. The memory 102 may also store one or more temperature thresholds and/or temperature threshold ranges corresponding to a respective soot combustion temperature.

The memory 102 may further store an instantaneous detected pass and/or fault event of the temperature control loop, and one or more predetermined event threshold values. Accordingly, the temperature diagnostic module 108 may communicate with the memory 102, and therefore increment one or more counters after a number of faults exceed a fault threshold value.

The regeneration control module 104 may apply algorithms known to those of ordinary skill in the art to determine when to initiate the regeneration operation to regenerate the PF 34. For example, the regeneration mode may be set when a soot load exceeds a threshold defined in the memory 102. Regeneration of the PF 34 shown in FIG. 1 may be based on or limited according to vehicle operating conditions and/or exhaust conditions. Various vehicle operating conditions 114 and the exhaust conditions 116 may be provided by sensors and/or other modules. In at least one embodiment, the regeneration control module 104 may also receive one or more entry conditions 118 monitored and communicated by the entry condition module 106. The entry conditions 118 input to the entry condition module 106 may include, but are not limited to, engine speed, exhaust temperature, time elapsed since a last regeneration, distance traveled since a last regeneration, amount of fuel consumed, exhaust gas volume flow rate within a specific range and the pressure differential across the PF 34. After the entry conditions 118 are satisfied, the regeneration control module 104 may initiate the regeneration operation that burns off particulate matter and soot to regenerate the PF 34.

For example, regeneration control module 104 can access values in the memory 102, and generate the regeneration control signal 120 that initiates the regeneration operation. One or more regeneration control signals 120 may control the auxiliary fuel injector/igniter 44 for example. In at least one embodiment, a regeneration control signal 120 is output that controls the amount of fuel injected, and/or the time at which the fuel is ignited. The temperature diagnostic module 108 may receive entry conditions 118 from the entry condition module 106. When entry conditions 118 are satisfied, the temperature diagnostic module 108 may perform a diagnostic of the regeneration operation to ensure that target soot combustion temperatures are achieved.

The temperature diagnostic module may receive an inlet temperature ($T_{INLET}$) 121 from the third temperature sensor 40 and an outlet temperature ($T_{OUTLET}$) 122 from the fourth temperature sensor 42. Based on the inlet and outlet temperatures, the temperature diagnostic module may determine a temperature profile of the PF 34 as discussed above.

The temperature diagnostic module 108 is in electrical communication with the regeneration module 104 and may detect an exothermic event, i.e., a time at which the auxiliary fuel is ignited to increase the exhaust temperature. In response to the exothermic event, the temperature diagnostic module receives ($T_{INLET}$) 121 and ($T_{OUTLET}$) 122, and determines a temperature differential value ($\Delta T = T_{OUTLET} - T_{INLET}$). The temperature differential ($\Delta T$) indicates the deviation of the increased temperature (generated by the exothermic event) with respect to the target soot combustion temperature. The temperature diagnostic module 108 compares $\Delta T$ to one or more threshold values ($T_{TH}$) stored in the memory 102. The $T_{TH}$ includes, but is not limited to, a single threshold value and a threshold range including a low-end threshold value and a high-end threshold value being greater than the low-end threshold value. If $\Delta T$ fails to satisfy $T_{TH}$, then the temperature diagnostic module 108 determines an occurrence of a temperature fault.

For example, if $\Delta T$ is below $T_{TH}$, then the temperature diagnostic module 108 nay detect a low auxiliary fuel event indicating that an insufficient amount of auxiliary fuel was injected by the auxiliary fuel injector/igniter 44 during the previous exothermic event. However, if $\Delta T$ exceeds $T_{TH}$, then the temperature diagnostic module 108 may detect a high auxiliary fuel event indicating an excessive amount of auxiliary fuel was injected by the auxiliary fuel injector/igniter 44 during the previous exothermic event. Although the aforementioned diagnostic operation describes an auxiliary fuel injection operation, the diagnostic is not limited thereto. The diagnostic module 108 may perform other diagnostics including, but not limited to, turbo boost performance affected by or intake air and/or exhaust leakage, faulty exhaust temperature sensors, fuel quality, performance of the OC device 30/SCR device 32/PF 34, and engine fuel injector performance.

The temperature diagnostic module 108 may diagnose the regeneration operation as failing after a single event. In another embodiment, however, the temperature diagnostic module 108 may communicate with the debounce module 110 to determine whether the regeneration operation is failed according to an event debouncing scheme as discussed in greater detail below. In addition, a determination that the regeneration operation is failed may include determining that at least one of the fuel injector/igniter 44 and the regeneration module 104 is faulty, i.e., operating improperly. For example, a faulty fuel injector/igniter 44 may fail to inject the proper amount fuel to generate the proper soot combustion temperature (i.e., the target temperature), or may fail to ignite the fuel at the proper time. A faulty regeneration module 104 may include failing to communicate the proper commands to the fuel injector/igniter 44.

According to another embodiment, the temperature diagnostic module 108 may generate a plurality of temperature differential values (i.e., a plurality of temperature deviations) occurring during a regeneration operation over a selected time period. The selected time period may be a portion of a time period over which the regeneration operation is performed. The time period may be 300 seconds, but is not limited thereto. The temperature differentials may be integrated over the time period to determine an integrated temperature deviation. The integrated temperature deviation may then be compared to a temperature threshold to determine whether a temperature fault has occurred. Accordingly, a more accurate and robust diagnostic of the PF regeneration operation may be obtained.

Upon completion of the time period, the temperature diagnostic module 108 compares the total number of determined temperature faults to a first threshold. If the total number of temperature faults exceeds the first threshold, the temperature diagnostic module 108 increments a counter. When the total fault count indicated by the counter exceeds a second threshold, the control module 35 may then determine a failure of the temperature control loop diagnostic. Otherwise, the control module 35 determines that the temperature control loop diagnostic is operating properly. In addition, the control module 35 may indicate the failure of the temperature control loop diagnostic by generating a signal that initiates an alert that includes, but is not limited to, a visual alert, and/or a sound alert.

Figure 3:
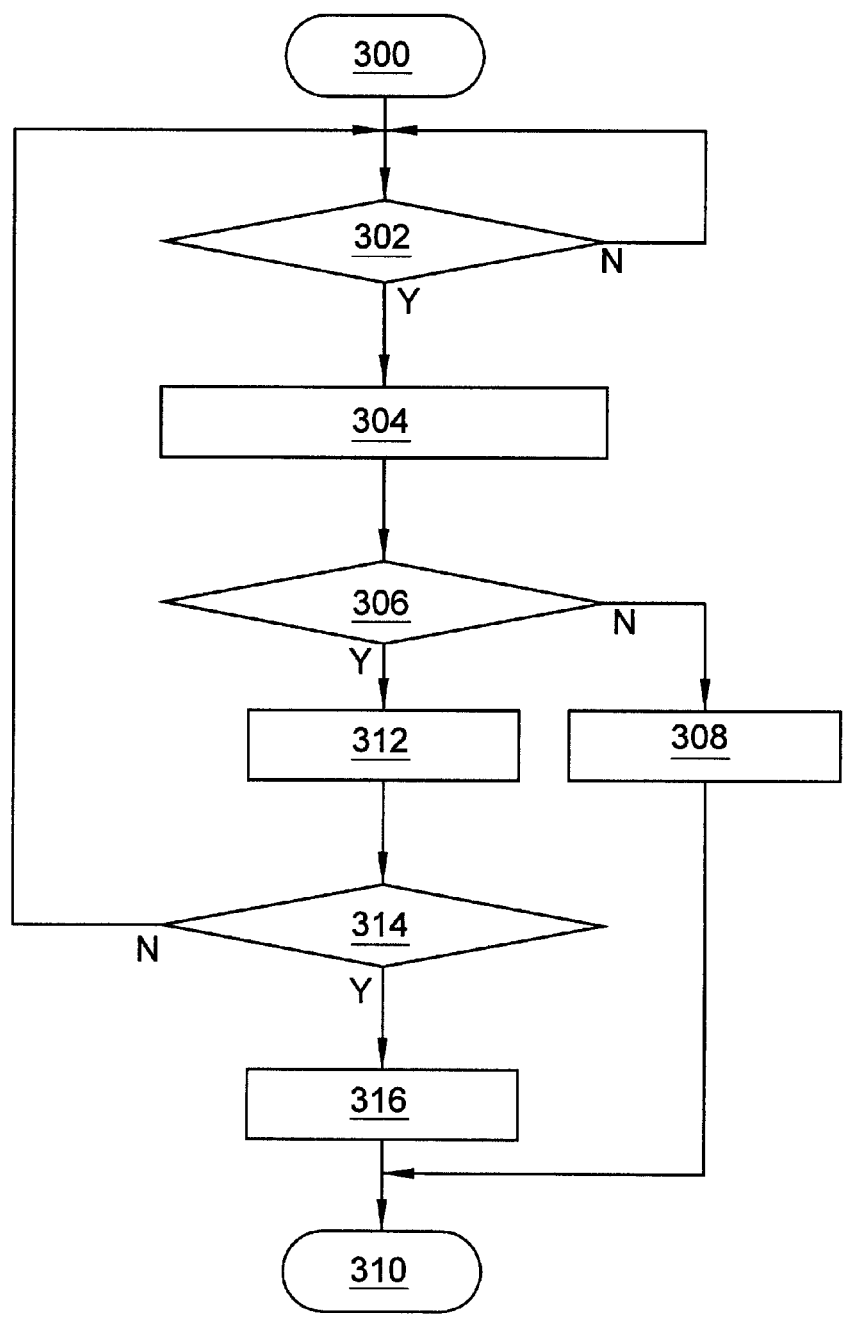
FIG. 3 is a flow diagram illustrating a method of diagnosing a temperature control loop of a particulate filter regeneration operation in accordance with exemplary embodiments.

Turning now to FIG. 3, a flow diagram illustrates a method of diagnosing a regeneration operation for regenerating a particulate filter according to an exemplary embodiment. The method begins at operation 300 and proceeds to operation 302 to determine whether entry conditions are met. If the entry conditions are not met, the method returns to operation 300. Otherwise, the method proceeds to operation 304 to determine one or more temperature faults occurring over a predetermined time period during the regeneration operation. At operation 306, a determination is made as to whether the number of temperature faults exceeds a fault threshold value. If the number of temperature faults is below the threshold value, the regeneration operation is determined as passing at operation 308, and the method ends at operation 310.

Turning again to operation 306, if the number of temperature faults exceeds the threshold value, a counter is incremented at operation 312. At operation 314, a determination is made as to whether the counter value of the counter exceeds a count threshold value. If the count value is below the count threshold, the method returns to operation 302 and the status of the entry conditions are determined. If the count value exceeds the count threshold, an alert is generated at operation 316, which indicates a failure of the temperature control loop included in the regeneration operation, and the method ends at operation 310.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system included with an internal combustion engine, comprising:
    a particulate filter to collect particulate matter from exhaust gas flowing therethrough;
    a regeneration control module in electrical communication with a fuel injector/igniter device to perform a regeneration operation that regenerates the particular filter, the regeneration operation including an exothermic event that heats the particulate filter above a target temperature that burns the particulate matter;
    at least one temperature sensor disposed adjacent the particular filter to determine at least one temperature of the exhaust gas, the at least one temperature sensor including a first temperature sensor disposed at an inlet of the particulate filter to determine an inlet temperature and a second temperature sensor disposed at an outlet of the particulate filter to determine an outlet temperature; and
    a temperature diagnostic module in electrical communication with the at least one temperature sensor to determine a temperature profile of the particulate filter based on the temperature of the exhaust gas, the temperature profile including a temperature differential based on the outlet temperature and the inlet temperature, to determine a temperature deviation of the particulate filter based on a comparison between the temperature profile and a target temperature and determines the temperature deviation in response to the temperature differential being at least one of above the target temperature or below the target temperature, and to generate a diagnostic signal that diagnoses the regeneration operation based on a plurality of temperature deviations and a selected time period,
    wherein the temperature diagnostic module integrates the plurality of temperature deviations over the selected time period to determine an integrated temperature deviation, and determines a faulty exothermic event in response to the at least one temperature deviation exceeding a target temperature threshold.

2. The exhaust treatment system of claim 1, wherein the temperature diagnostic module determines the regeneration operation is failed in response to the integrated temperature deviation exceeding a fail threshold value.

3. The exhaust treatment system of claim 2, wherein determining the regeneration operation is failed includes determining that at least one of the fuel injector/igniter device and the regeneration module is faulty.

4. A hardware control module to diagnose a regeneration operation for regenerating a particulate filter of an internal combustion engine exhaust treatment system, the control module comprising:
    a memory to store a plurality of target temperature values indicating a combustion temperature that burns soot contained on the particulate filter, at least one inlet temperature value indicating a temperature at an inlet of the particulate filter, and at least one outlet temperature value indicating a temperature at an outlet of the particulate filter; and
    a temperature diagnostic module in electrical communication with the memory to determine a temperature profile of the particulate filter based on a difference between the outlet temperature and the inlet temperature, to determine a temperature deviation of the particulate filter based on a comparison between the temperature profile and a target temperature in response to the temperature profile being at least one of above the target temperature or below the target temperature, and to generate a diagnostic signal that diagnoses the regeneration operation based on a plurality of temperature deviations and a selected time period,
    wherein the temperature diagnostic module determines that the regeneration operation generates a faulty exothermic event in response to the temperature deviation exceeding a target temperature threshold, and integrates a plurality of temperature deviations over the selected time period to determine an integrated temperature deviation.

5. The hardware control module of claim 4, wherein the temperature diagnostic module determines the regeneration operation is failed in response to the integrated temperature deviation exceeding a fail threshold value.

6. The hardware control module of claim 5, wherein determining the regeneration operation is failed includes determining that at least one of a fuel injector/igniter device and a regeneration module is faulty.

7. A method of diagnosing a regeneration operation for regenerating a filter substrate of a particulate filter included in an internal combustion engine exhaust treatment system, the method comprising:
　performing an exothermic event to heat the particulate filter above a target temperature that burns particulate matter contained in the filter substrate;
　determining a temperature profile of the particulate filter in response to calculating a temperature differential between an outlet temperature of the particulate filter and an inlet temperature of the particulate filter;
　determining at least one temperature deviation of the particulate filter with respect to the target temperature in response to the temperature differential being at least one of above the target temperature or below the target temperature, the temperature differential based on a comparison between the temperature profile and a target temperature;
　determining a faulty exothermic event in response to the at least one temperature deviation exceeding a target temperature threshold
　generating a diagnostic signal that diagnoses the regeneration operation based on a plurality of temperature deviations and a selected time period; and
　integrating the plurality of temperature deviations over the selected time period to determine an integrated temperature deviation.

8. The method of claim 7, further comprising determining that the regeneration operation is failed in response to the integrated temperature deviation exceeding a fail threshold value.

9. The method of claim 8, wherein determining the regeneration operation is failed includes determining that at least one of a fuel injector/igniter and a regeneration module is faulty.

* * * * *